United States Patent [19]
Jansen-Vanbeek et al.

[11] 3,769,940
[45] Nov. 6, 1973

[54] ANIMAL HOBBLE

[76] Inventors: Guy Jansen-Vanbeek, Rt. 1, Caldwell, Idaho 83605; John Jansen-Vanbeek, Rt. 1, Fruitland, Idaho 83619

[22] Filed: Jan. 24, 1972

[21] Appl. No.: 219,983

[52] U.S. Cl. ............................................. 119/126
[51] Int. Cl. ........................ A01k 15/00, B68b 01/14
[58] Field of Search ................... 119/126, 127, 128, 119/96

[56] References Cited
UNITED STATES PATENTS
1,248,651  12/1917  Harper .............................. 119/126

FOREIGN PATENTS OR APPLICATIONS
583,557   10/1958  Italy .................................. 119/127
950,428   2/1964   Great Britain ..................... 119/128
179,253   11/1935  Switzerland ....................... 119/126

*Primary Examiner*—Louis G. Mancene
*Assistant Examiner*—James H. Czerwonky
*Attorney*—John W. Kraft

[57] ABSTRACT

The hobble of this invention includes a substantially C-shaped body portion and a yoke portion carried by a shank threadably mounted in the body portion thereof. The yoke portion of the hobble is engageable with the rear tendon of an animal's hind leg, while the body portion is engageable with the front portion of the leg. The yoke portion is rotatably mounted by means of a screw and cooperating annular slot on the shank so that the yoke may remain stationary during rotation of the shank, the shank being operable to move the yoke portion inwardly and outwardly within the body portion in response to rotation of the shank.

1 Claim, 5 Drawing Figures

PATENTED NOV 6 1973 3,769,940
SHEET 2 OF 2
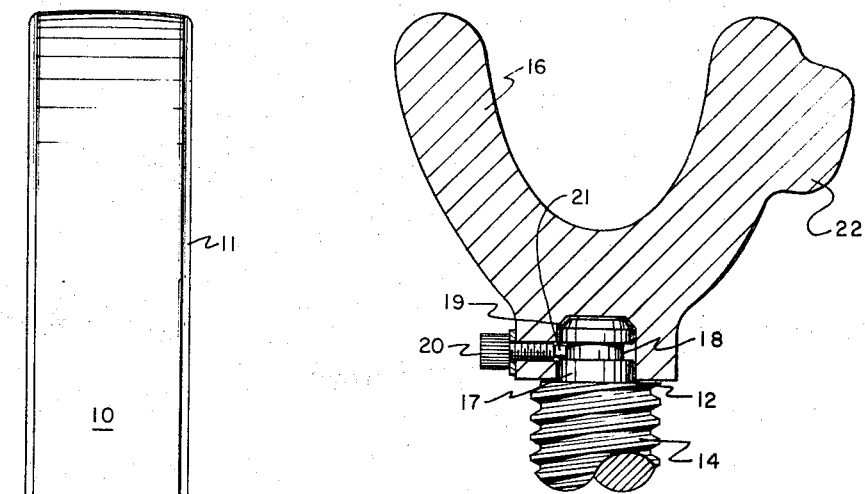
FIG. 4
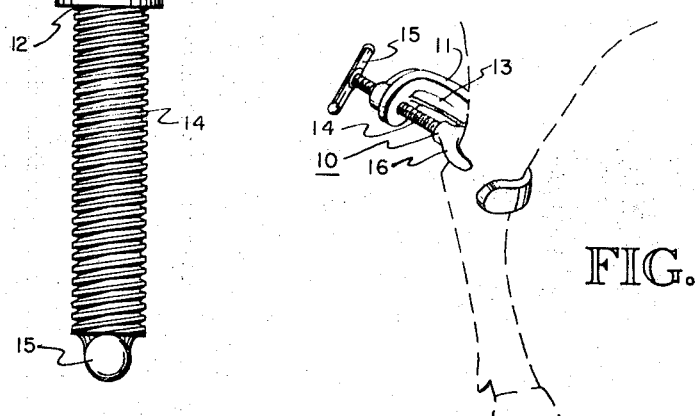
FIG. 3
FIG. 5

ANIMAL HOBBLE

FIELD OF INVENTION

The present invention relates to animal hobbles and, more particularly, to animal hobbles operable to cause an animal, such as a cow, to remain substantially motionless when attached.

BRIEF DESCRIPTION OF THE PRIOR ART

The art of hobbling animals, such as cows, oxen, horses, and the like, has long been used and employed to restrain their movements. Such means as tethers, leashes, and bindings about the feet have been known for many years. It is particularly important to restrain the movement of cows and goats while they are being milked to avoid injury to the animal, the milker, and to obtain the milk. It has been common practice to place such animals in stanchions which tend to restrain head movement and to pacify the animal during milking by feeding it. However, such means do not restrict movements of the legs and body, particularly in the hind quarters of the animal. Such movement of the animal frequently causes injury to the person milking, equipment, or to the animal itself.

Accordingly, it is an extremely important object of the present invention to provide a hobble operable to tend to restrain movement of the legs and limbs of the animal.

A further object of this invention is to provide a hobble simple in construction; a hobble which tends not to cause discomfort or injury to the animal; and a hobble operable to be readily and hastily applied and removed from the animal.

These and other objects shall become apparent from the description following, it being understood that modifications may be made without affecting the teachings of the invention here set out.

SUMMARY OF THE INVENTION

Generally, the hobble of this invention includes a substantially C-shaped body portion and a yoke portion carried by a shank threadably mounted in the body portion thereof. The yoke portion of the hobble is engageable with the rear tendon of an animal's hind leg, while the body portion is engageable with the front portion of the leg. The yoke portion is rotatably mounted on the shank so that the yoke may remain stationary during rotation of the shank, the shank being operable to move the yoke portion inwardly and outwardly within the body portion in response to rotation of the shank.

A more thorough and comprehensive understanding may be had from the detailed description of the preferred embodiment when read in connection with the drawings forming a part of this specification.

BRIEF DESCRIPTION OF THE DRAWINGS

FIG. 3 is a rear elevational view of the animal hobble of this invention as viewed from the side opposite the FIG. 2.

FIG. 4 is a cross-sectional side elevational view of the yoke portion drawn to a larger scale showing to advantage the swivel connector means of the yoke portion connected to the threaded shank portion.

FIG. 5 is a perspective view of the hobble of this invention fastened to the leg of a cow shown in broken lines for illustrative purposes.

DETAILED DESCRIPTION OF THE PREFERRED EMBODIMENT

Figure 1:
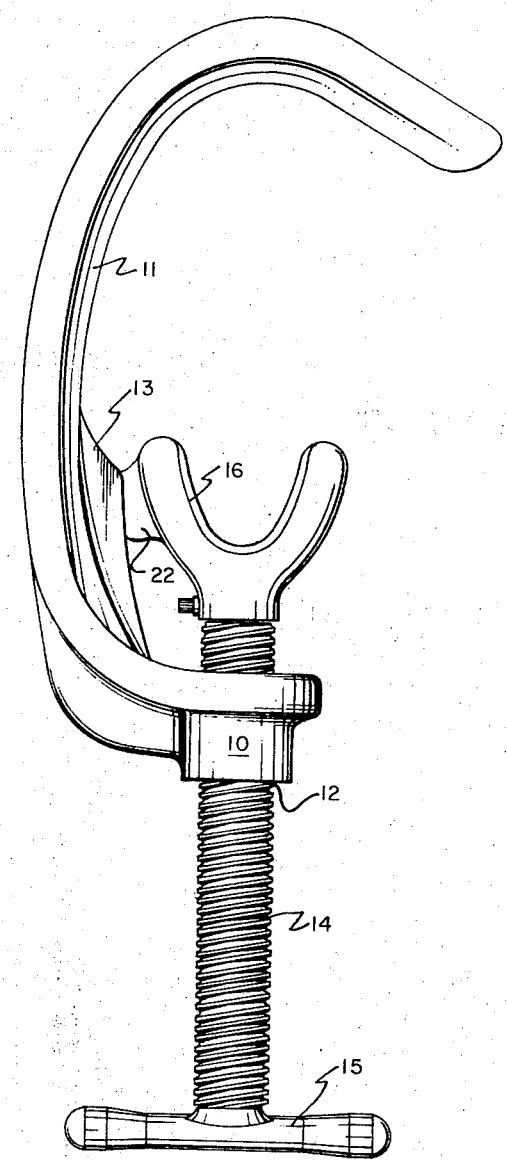
FIG. 1 is a side elevational view of the animal hobble of the present invention showing to advantage the yoke and yoke stop of the invention.
Figure 2:
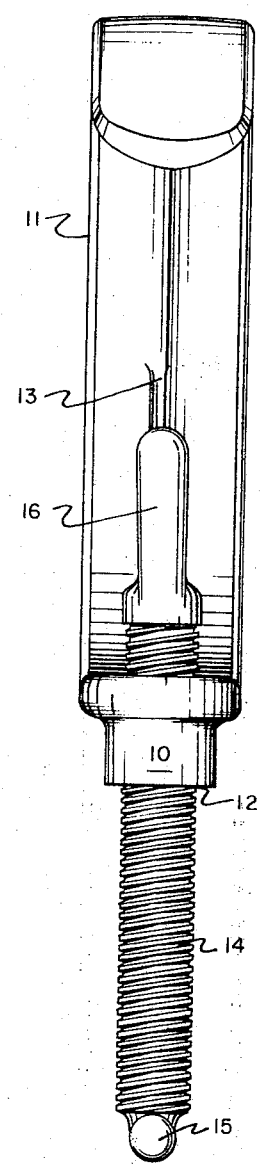
FIG. 2 is a front elevational view of the invention.

Referring now to the drawings and, more particularly, to the FIGS. 1, 2 and 3, the animal hobble of the present invention is generally shown and identified by the numeral 10. The hobble 10 includes a substantially C-shaped body portion 11 having a threaded entranceway 12 at its lowermost terminal side portion and a yoke stop portion 13 on its innermost upstanding side. A threaded shank 14 is threadably engageable with the entranceway 12. The shank 14 is provided with a handle 15 at one of its terminal ends and a yoke 16 suitably fastened at the terminal end opposite thereof. The end of the shank 14 adjacent the yoke 16 is provided with an upstanding projection 17 having an annular slot 18 distally disposed therein, as shown to advantage in the cross-sectional elevational view of the FIG. 4. The yoke 16 is provided with a recess 19 in the lowermost portion of the yoke 16 engageable with the projection 17. A screw 20 is threadably mounted transversely in the yoke 16 coincident with the slot 18 in the projection 17 of the shank 14. The screw 20 includes a projecting portion 21 at one of its terminal ends engageable with the slot 18. Hence, the yoke 16 may rotate or swivel on the projection 17 of the shank 14 while being fastened thereto by the screw 20. In this manner the yoke 16 may be juxtapositioned to the tendon of an animal, such as a cow, as shown to advantage in the FIG. 5 and hereinafter later more fully disclosed. One of the upstanding legs of the yoke is preferably provided with a outwardly projecting stop dog 22 engageable with the upstanding yoke stop portion 13 carried by the body portion 11. The yoke 16 is moved inwardly and outwardly within the body portion 11 in response to rotation of the shank 14.

In practice it has been found that by maintaining a constant pressure on the rear tendon of one of the hind legs of an animal the animal tends to stand in one place. In operation, the animal hobble of the present invention is juxtapositioned on one of the hind legs of an animal above the leg joint with the body portion 11 toward the front portion of the leg and the yoke 16 engaging the tendon thereof. The hobble 10 is juxtapositioned and the yoke 16 is moved toward the tendon in response to movement of the shank 14 until sufficient pressure is exerted on the tendon to cause the animal to stand still. It may be seen that the stop dog 22 of the yoke 16 engages the yoke stop portion 13. This engagement of the dog 22 and the portion 13 maintains the alignment of the yoke 16 as the yoke 16 is actuated inwardly and outwardly. In this manner, the yoke 16 does not tend to exert a twisting force on the tendon, and avoids injury to the animal.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

We claim:

1. An animal hobble comprising a substantially C-shaped body portion having a threaded entranceway in the lowermost side thereof, a shank threadably engageable with said entranceway, said shank having a handle at one of its terminal ends and a yoke rotatably mounted at the terminal end opposite, said yoke being disposed within said body portion, said yoke being engageable with the tendon on the rear side of a hind leg of an animal, said yoke including a stop dog projecting outwardly from said yoke, said C-shaped body portion including an upstanding yoke stop portion, said stop dog being engageable with said yoke stop portion, said stop dog and said yoke stop portion being operable to juxtaposition said yoke portion during inward and outward movement of said yoke within said body portion in response to rotation of said shank, said shank including a projection portion at the termainl end opposite said handle, said projecting portion having an annular slot distally disposed therein, said yoke including a recess portion engageable with said projecting portion, a screw threadably carried transversely in said yoke portion and being coincident with said annular slot in said projecting portion of said shank, said screw including a projecting portion engageable with said slot, said screw being operable to rotatably fasten said yoke on said shank.

* * * * *